(12) United States Patent
Fukuyama

(10) Patent No.: US 12,344,553 B2
(45) Date of Patent: Jul. 1, 2025

(54) HEAT RESISTANT TEXTILE SLEEVE AND A METHOD OF MAKING THE HEAT RESISTANT TEXTILE SLEEVE

(71) Applicant: FEDERAL-MOGUL POWERTRAIN LLC, Southfield, MI (US)

(72) Inventor: Shozo Fukuyama, Tokyo (JP)

(73) Assignee: Systems Protection Group US LLC, Northville, MI (US)

( * ) Notice: Subject to any disclaimer, the term of this patent is extended or adjusted under 35 U.S.C. 154(b) by 749 days.

(21) Appl. No.: 16/580,606

(22) Filed: Sep. 24, 2019

(65) Prior Publication Data

US 2020/0095710 A1 Mar. 26, 2020

Related U.S. Application Data

(60) Provisional application No. 62/736,030, filed on Sep. 25, 2018.

(51) Int. Cl.
*D03D 3/02* (2006.01)
*C03C 25/1095* (2018.01)
(Continued)

(52) U.S. Cl.
CPC ....... *C03C 25/1095* (2013.01); *D06M 15/643* (2013.01); *D06M 15/70* (2013.01);
(Continued)

(58) Field of Classification Search
CPC . C03C 25/1095; D06M 15/643; D06M 15/70; D06M 2200/30; B60R 16/0215; D10B 2505/12; F16L 57/06
(Continued)

(56) References Cited

U.S. PATENT DOCUMENTS 3,389,121 A 6/1968 Burzynski et al.
3,445,267 A * 5/1969 Layne ................... C08L 83/04
442/72

(Continued)

FOREIGN PATENT DOCUMENTS

CN 1597293 A 3/2005
CN 202252794 U * 5/2012
(Continued)

OTHER PUBLICATIONS

Machine translation of CN-202252794 (Year: 2012).*
(Continued)

*Primary Examiner* — Vincent Tatesure
(74) *Attorney, Agent, or Firm* — Dickinson Wright PLLC

(57) ABSTRACT

A textile sleeve for protecting an elongated member comprises a tubular body, made from a woven or braided fiberglass yarn, having an inner surface and an outer surface. A coating adheres to the outer surface providing heat resistance to said tubular body. The coating is a silicone rubber containing phenyl partially disposed therein. According to one aspect, the silicone rubber is a phenyl containing polysiloxane. According to another aspect, the silicone rubber has a formula of R—SiO$_{3/2}$ wherein R includes phenyl and (Continued)

oxygen or R consists of phenyl and oxygen. The tubular body has a heat resistance of at least 550° C. A method of making the textile sleeve is also disclosed herein.

3 Claims, 5 Drawing Sheets

(51) Int. Cl.
*D06M 15/643* (2006.01)
*D06M 15/70* (2006.01)
*B60R 16/02* (2006.01)
*F16L 57/06* (2006.01)

(52) U.S. Cl.
CPC ..... *B60R 16/0215* (2013.01); *D06M 2200/30* (2013.01); *D10B 2505/12* (2013.01); *F16L 57/06* (2013.01)

(58) Field of Classification Search
USPC .............................................. 139/387, 387 R
See application file for complete search history.

(56) References Cited

U.S. PATENT DOCUMENTS

| | | |
|---|---|---|
| 4,316,930 A | 2/1982 | Stengle, Jr. |
| 4,340,090 A | 7/1982 | Matsushita et al. |
| 2011/0083879 A1 | 4/2011 | Avula et al. |
| 2012/0040114 A1* | 2/2012 | Chen ...................... F16L 57/04 428/34.5 |
| 2016/0214894 A1* | 7/2016 | Dandekar ........... C04B 20/1051 |

FOREIGN PATENT DOCUMENTS

| | | |
|---|---|---|
| CN | 102667964 A | 9/2012 |
| CN | 103421327 B | 12/2015 |
| CN | 103483824 B | 3/2016 |
| JP | 55154354 A | 12/1980 |
| JP | S5717448 A | 1/1982 |
| WO | 2011044345 A2 | 4/2011 |
| WO | 2012033609 A1 | 3/2012 |

OTHER PUBLICATIONS

International Search Report, mailed Jan. 3, 2020 (PCT/US2019/052881).

Owens-Illinois Glass Resin Polymer, product No. T-950 Regular (discussed in U.S. Pat. No. 4,316,930).

Standard Dictionary of Chemical Terms, Third Edition, Maruzen Publishing Co., Ltd., Jan. 30, 1996, p. 296 (refer to the term "silica").

* cited by examiner

HEAT RESISTANT TEXTILE SLEEVE AND A METHOD OF MAKING THE HEAT RESISTANT TEXTILE SLEEVE

CROSS REFERENCE TO RELATED APPLICATION

This application claims priority to Provisional Application Ser. No. 62/736,030 filed on Sep. 25, 2018, the entire disclosure of which is incorporated herein by reference in its entirety.

BACKGROUND OF THE INVENTION

1. Field of the Invention

The present invention generally relates to textile sleeves for protecting elongate members, and methods of manufacturing the textile sleeves.

2. Description of the Prior Art

Textile sleeves are known in the art and can be used for a variety of applications. One such application is in a thermal sensor for an engine of a vehicle to improve heat resistance of the thermal sensor. Often, the textile sleeve is applied on a wire harness of the thermal sensor to provide thermal and electrical insulation to each wire. Typically, in the industry, the required heat resistance temperature for the textile sleeve is approximately 550° C. with no outgassing and carbonization. At the same time, the textile sleeve must be flexible. One such a solution is to use a Polytetrafluoroethylene (PTFE) material sleeve. However, the PTFE may not meet preferred heat resistance and outgassing requirements. Alternatively, another solution is to use a sleeve made from a ceramic material. However, the ceramic material is very brittle and can be easily cracked by an external excitation, e.g. a vibration.

SUMMARY OF THE INVENTION

The present invention provides a textile sleeve that has improved heat resistance with minimal outgassing. In addition, the present invention provides a textile sleeve having improved durability, flexibility, and fray protection.

It is one aspect of the present invention to provide a textile sleeve for protecting an elongated member. The textile sleeve comprises a tubular body having an inner surface and an outer surface. A coating adheres to the outer surface providing heat resistance to the tubular body. The coating is a silicone rubber containing phenyl partially disposed therein. Phenyl decomposes at a temperature up to 650° C. Accordingly, presence of the phenyl in the silicone rubber effectively increases the heat resistance of the silicone rubber and the tubular body thereby allowing the tubular body to have a heat resistance of at least 550° C. In addition, the silicone rubber is not electro-conductive which provides the tubular body electrical insulation properties. Furthermore, the presence of the phenyl group adds flexibility to the cured resin thereby preventing the cracking of silica and end fray of the tubular body that is either woven or braided.

It is another aspect of the present invention to provide a method of making a textile sleeve. The method comprises a first step of providing a tubular body. The method then follows with a step of forming a coating composition containing a silicone resin including phenyl functional groups and methyl functional groups. Next, the method proceeds with coating the tubular body with the coating composition to produce a coated tubular body. Then, the method proceeds with a step of curing the coated tubular body by subjecting the coated tubular body to a three-stage curing process to produce the textile sleeve. Splitting the curing treatment into three different stages can provide a gradual increase in the heating temperature which helps the coated tubular body to retain flexibility as well as its heat resistant properties. If the coated tubular body is subjected to an immediate or sudden increase in the heating temperature, the coated tubular body can harden immediately and break without any flexibility. Since the hydroxyl group, the methyl group, and the phenyl group are being removed from the coated tubular body during the curing treatment, the coated tubular body exhibits a weight loss throughout the curing treatment process.

It is another aspect of the present invention to provide a method of making a textile sleeve. The method comprises a first step of providing a tubular body. The method then proceeds with a step of forming a coating composition having a density of between 2% and 10% containing a silicone resin including phenyl functional groups and methyl functional groups. Next, the method proceeds with a step of coating the tubular body with the coating composition to produce a coated tubular body. Then, the method follows with a step of curing the coated tubular body to obtain the textile sleeve. It is important to ensure that the density of the coating composition does not exceed 10% because, in the event that the density of the coating composition exceeds 10%, the coated tubular body of braided or woven fiberglass can be easily broken without any flexibility.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Figure 1:
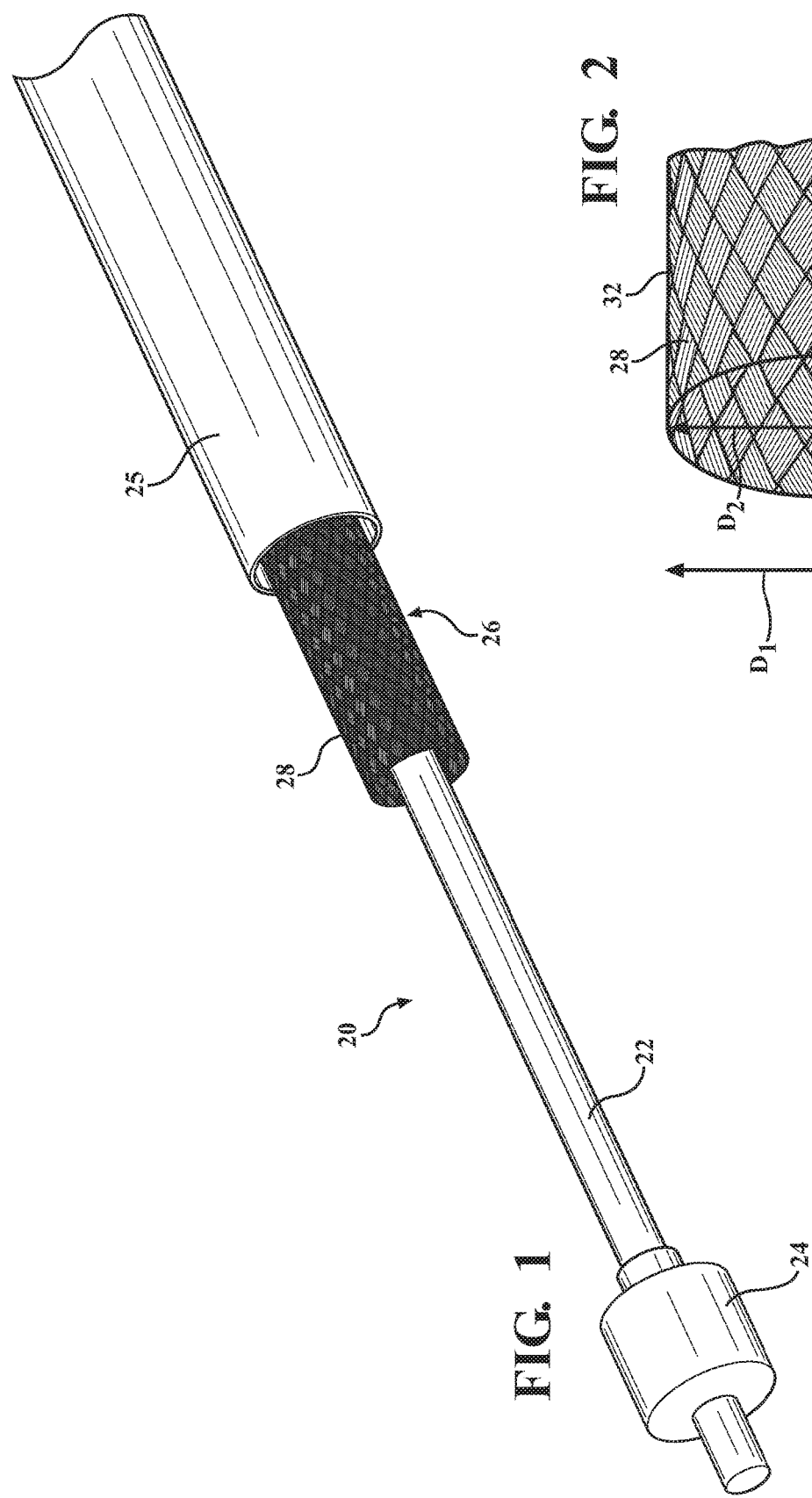
FIG. 1 is exploded view of a thermal sensor including the textile sleeve in accordance with an embodiment of the present invention.

Referring to the Figures, wherein like numerals indicate corresponding parts throughout the several views, a textile sleeve constructed in accordance with one embodiment of the present invention is generally shown in FIG. 1.

The textile sleeve 20, having a generally tubular shape, is disposed about a wire harness 22 of a thermal sensor 24 to provide electrical insulation and heat resistance of at least 550° C. to the wire harness 22 of the thermal sensor 24. A metal collar 25 is disposed about the textile sleeve to sandwich the textile sleeve 20 between the metal collar 25 and the wire harness 22. The textile sleeve 20 has a proper hardness and is flexible for vibration, bending, and easy-installation. The textile sleeve 20 also prevents the outgassing of the thermal sensor 24 to allow the thermal sensor 24 to provide an accurate detect with minimal interference. It should be appreciated that, in one embodiment of the present invention, the textile sleeve 20 should be white in color to differentiate around components of the thermal sensor 24.

Figure 2:
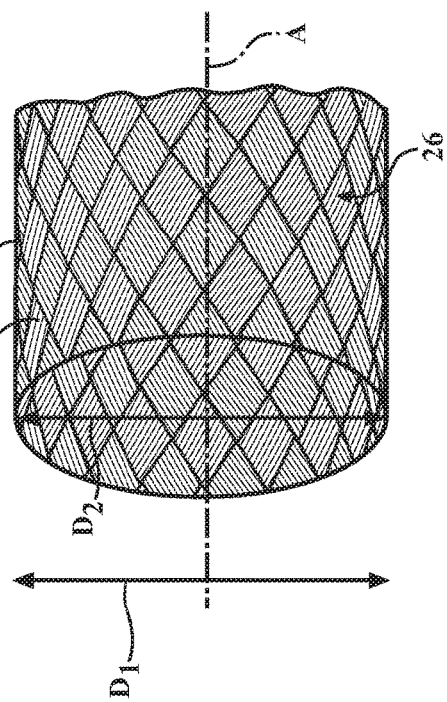
FIG. 2 is a fragmentary perspective view of the textile sleeve.

Referring to FIGS. 1 and 2, the textile sleeve 20 has a tubular body 26 that is either woven or braided. According to one embodiment of the present invention, the tubular body 26 is made from a woven or braided fiberglass yarn. The tubular body 26 is constructed of any suitable length extending along a longitudinal axis A. Accordingly, the tubular body 26 can be constructed having various structural properties and configurations. The tubular body 26 has an outer surface 28 and an inner surface 30 extending about the longitudinal axis A. The outer surface 28 of the tubular body 26 defines an outer diameter D1. The inner surface of the tubular body 26 defines an inner diameter D2. It should be appreciated that, in one embodiment of the present invention, the outer diameter D1 can be no more than 2.7 mm and the inner diameter D2 can be no less than 1.32 mm.

The outer surface 28 of the tubular body 26 has a coating 32 dispose thereon and adhering to the outer surface 28 for providing heat resistance to the tubular body 26. The coating 32 is a silicone rubber containing phenyl or phenyl functional group partially disposed therein. Alternatively, the silicone rubber can also be a phenyl containing polysiloxane. The silicone rubber is a hard coating with a 3D network molecular structure made from an organically modified siloxane having a formula of R—$SiO_{3/2}$ with R including phenyl ($C_6H_5$) and oxygen. Accordingly to another embodiment of the present invention, the silicone rubber is a hard coating with a 3D network molecular structure made from an organically modified siloxane having a formula of R—$SiO_{3/2}$ with R consisting of phenyl ($C_6H_5$) and oxygen. It is important for the silicone rubber to include the phenyl group. In particular, the phenyl group decomposes at a temperature up to 650° C. Accordingly, the presence of the phenyl group in the silicone rubber effectively increases the heat resistance of the silicone rubber and the tubular body 26 thereby allowing the tubular body 26 to have a heat resistance of at least 550° C. In addition, the silicone rubber is not electro-conductive which provides the tubular body 26 electrical insulation properties. Furthermore, the presence of the phenyl group adds flexibility to the cured resin thereby preventing the cracking of silica and end fray of the tubular body 26 that is either woven or braided.

Figure 3:
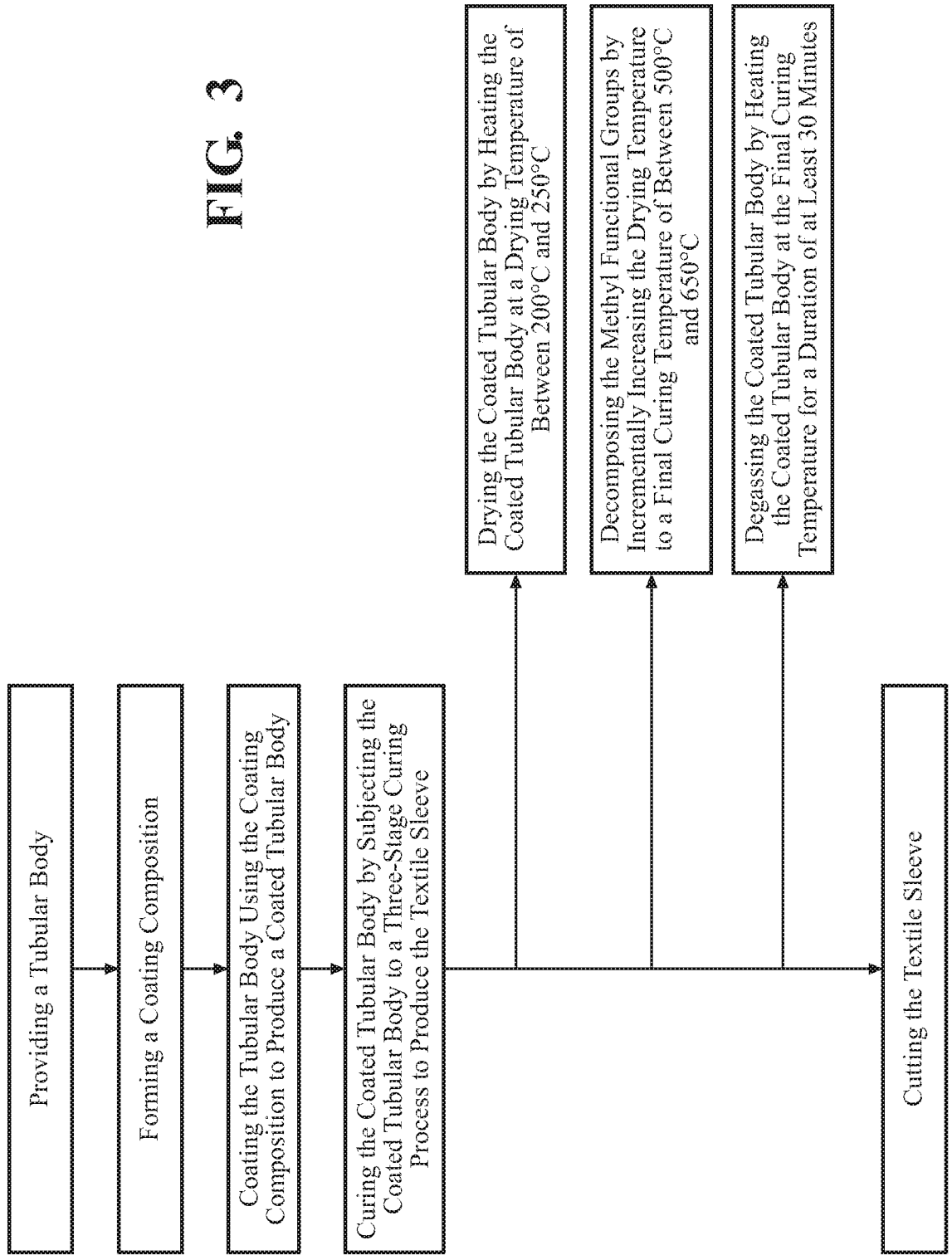
FIG. 3 is a schematic diagram of the method of making the textile sleeve.

It is another aspect of the present invention to provide a method of making the textile sleeve 20. The method, as illustrated in FIG. 3, includes a first step of providing a tubular body 26. According to one embodiment of the present invention, the tubular body 26 can be formed by interlacing, e.g. weaving or braiding, a fiberglass yarn. The method then proceeds with a step of forming a coating composition containing a silicone resin including phenyl functional groups and methyl functional groups. The step of forming the coating composition includes a step of dissolving the silicone resin in xylene and an additive solution to form a silicone solution having a density of 50%. It should be appreciated that xylene and the additive solution can contain mixtures of hydroxyl, methyl, and phenyl functional groups. The, the silicone solution is blended with distilled water to produce the coating composition having a density of between 2% and 10%. It is important to ensure that the density of the coating composition does not exceed 10% because, in the event that the density of the coating composition exceeds 10%, the coated tubular body of braided or woven fiberglass can be easily broken without any flexibility. Hence, for the present invention, it is preferable to have the density of the coating solution below 10% and ranging between 2%-8% depending on the required hardness, flexibility, and fray-performance of the textile sleeve 20.

After preparing the coating solution, the tubular body 26 is coated with coating composition by immersing the tubular body 26 in the coating composition to form a coated tubular body. It should be appreciate that other methods such as, but not limited to, spraying can be used to apply the coating solution to the tubular body to form the coated tubular body.

Figure 4:
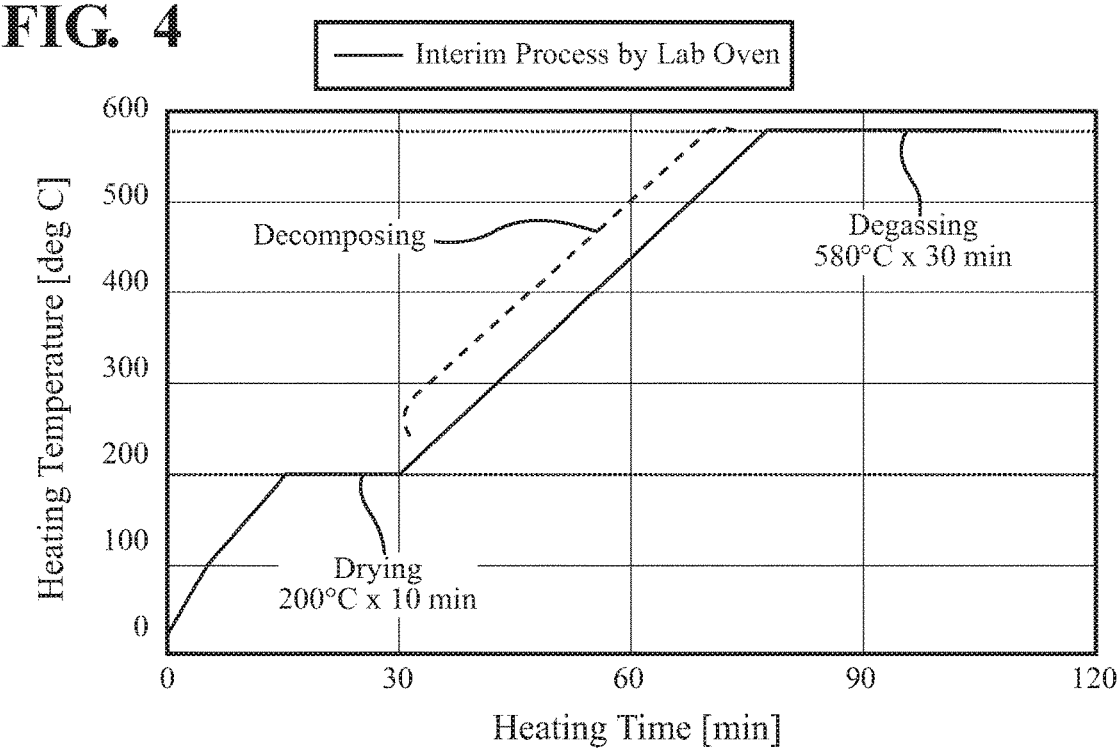
FIG. 4 a graphical illustration of heating temperature vs. heating time for the curing treatment of the textile sleeve.

Next, the method proceeds with a step of curing the coated tubular body to obtain the textile sleeve 20. During the step of curing, the coated tubular body is placed in an oven and is subjected to a three-stage curing process, as best illustrated in FIGS. 3 and 4, to produce the textile sleeve 20. During a first stage of the three-stage curing process, the coated tubular body is dried by heating the coated tubular body at a drying temperature of between 200° C. and 250° C. for a drying duration of approximately 10 minutes. During the drying step, the hydroxyl groups in the coated tubular body is removed to form Si—O—Si bonds. In other words, the first stage of the curing treatment can be considered as a condensation process wherein the hydroxyl group is evaporated/removed from the coated tubular body.

After the first stage, the curing process follows with a second stage of decomposing the methyl functional groups from the coated tubular body. During the decomposing step, the dry temperature is incrementally increased to a final curing temperature of between 500° C. and 650° C. Preferably, the drying temperature is raised at a predetermined rate of between 5° C.-10° C./minute to the final curing temperature. During the decomposing step, the methyl functional groups, which decompose between 300° C. and 400° C., are remove from the coated tubular body.

After the second stage, the curing process follows with a third stage of degassing. During the step of degassing, the coated tubular body is heated at the final curing temperature for a duration of at least 30 minutes. More preferably, the coated tubular body is heated at a temperature of 580° C. for the duration of at least 30 minutes to form the silicone rubber on the tubular body 26. Typically, phenyl functional groups decompose around approximately 650° C. Accordingly, during the third stage of the curing treatment, some of the phenyl functional groups in the coated tubular body are decomposed and removed. In other words, the third stage of the curing treatment can be considered a second decomposition process wherein some of the phenyl functional groups are decomposed and removed from the coated tubular body while some of the phenyl functional groups is retained in the silicone rubber formed on the coated tubular body. At the end of the third stage of the curing treatment, the silicone rubber disposed on the tubular body is Silica ($SiO_2$) containing phenyl.

It is important to split the curing treatment into three different stages to provide a gradual increase in the heating temperature because, if the coated tubular body is subjected to an immediate or sudden increase in the heating temperature, the coated tubular body can harden immediately and break without any flexibility. Since the hydroxyl group, the methyl group, and the phenyl group are being removed from the coated tubular body during the curing treatment, the coated tubular body exhibits a weight loss throughout the curing treatment process. The weight loss of the coated tubular body during the curing treatment is illustrated in FIG. 4.

After the curing treatment, the textile sleeve 20 obtained can be cut into a desired length. The textile sleeve 20 can be either cold cut by a blade or hot cut (heated over 800° C.). It should be appreciated that the hot cut method can form a strong cut edge on the textile sleeve 20.

Figure 5:
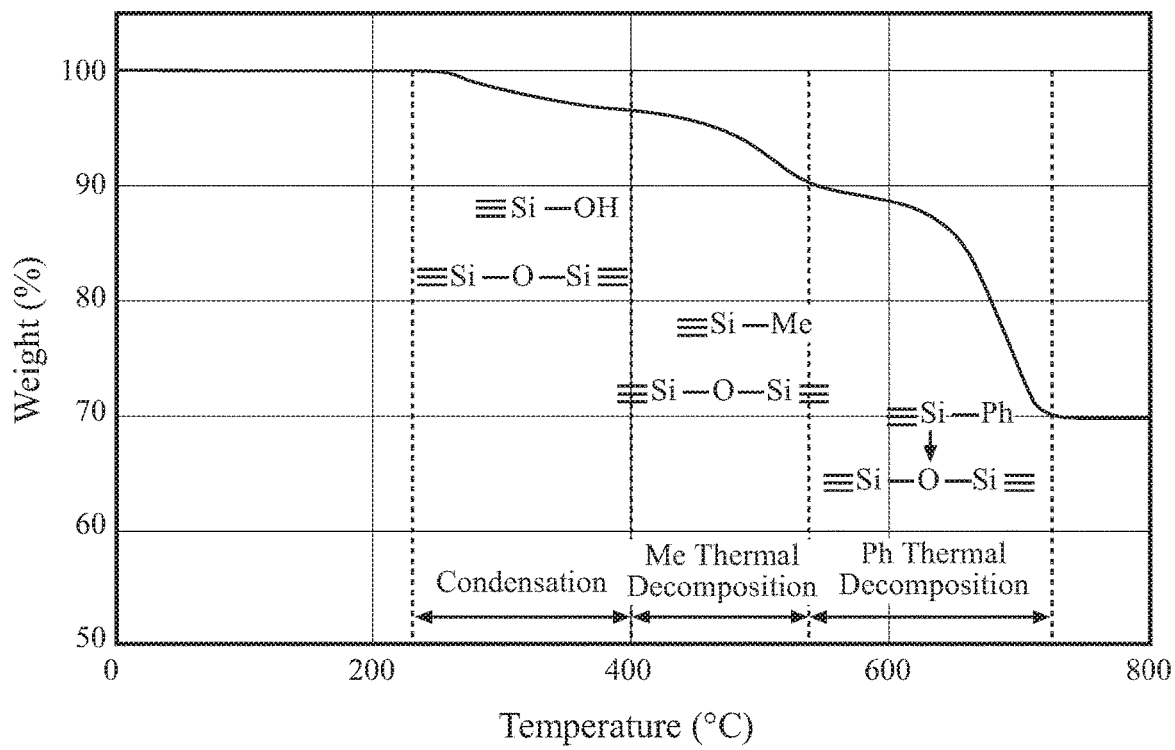
FIG. 5 is a graphical illustration of weight % vs. heating temperature during the curing treatment of the textile sleeve.
Figure 6:
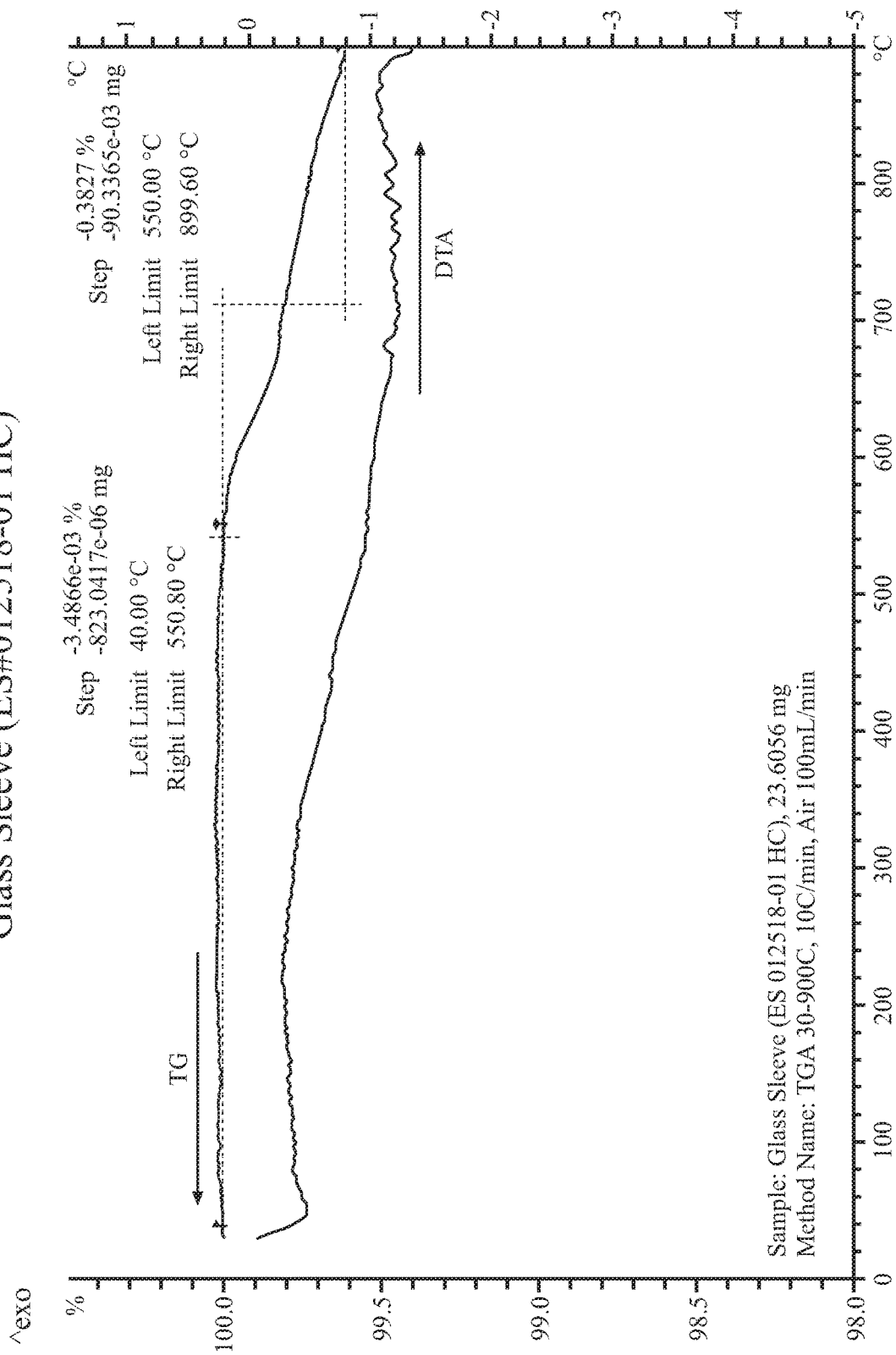
FIG. 6 is a thermalgravimetric (TG) analysis and a differential thermal analysis (DTA) for the textile sleeve.

A thermalgravimetric (TG) analysis and a differential thermal analysis (DTA) were conducted using the textile sleeve 20 including the cured resin. As illustrated in FIG. 5, after a heating process, due to the high temperature resistance of the phenyl group, the textile sleeve 20 exhibited no weight loss around 550° C. This is an indication that there is no outgassing performance of the textile sleeve 20 around 550° C.

Figure 7:
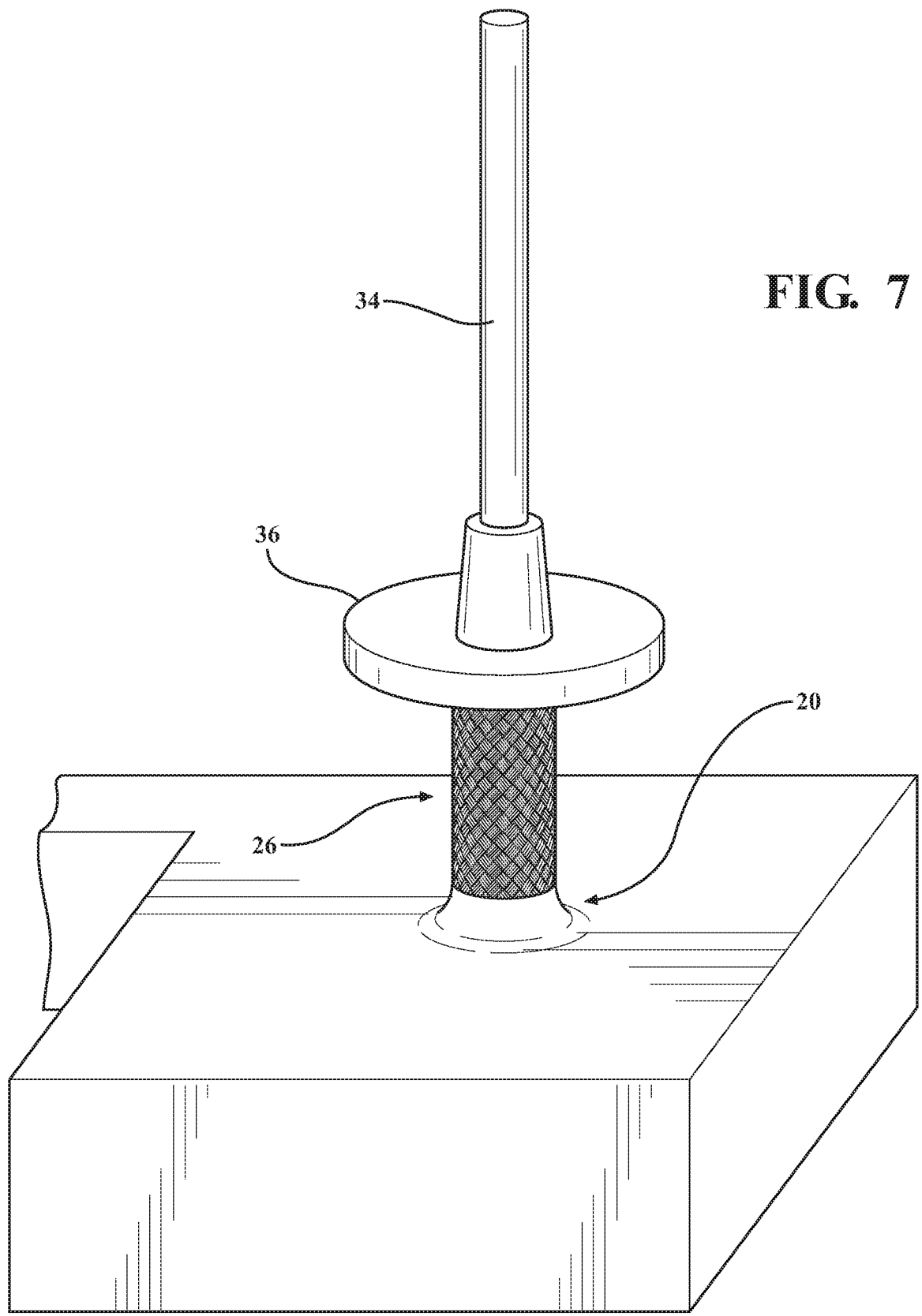
FIG. 7 is a perspective view of a mandrel having the textile sleeve disposed thereon for the fray test of the textile sleeve.

A fray test is also performed using the textile sleeve 20 according to an example embodiment of the present invention. During the fray test, as shown in FIG. 7, the textile sleeve 20 having 14 mm in length is disposed on a mandrel 34 having a 1.5 mm outer diameter. A flange plate 36 is inserted through the mandrel to sandwich the textile sleeve 20 between the mandrel 34 and the flange plate 36. The textile sleeve 20 is compressed, by approximately 4 mm, between the flange plate 36 and released for 10 cycles. After 10 cycles, no fray can be found along a cut edge of the textile sleeve 20 constructed according to the present invention. Similarly, the fray test is also conducted on a textile sleeve without the coating of the cured resin. After 5 cycles, the cut edge of the textile sleeve begins to unravel.

It should be recognized that the textile sleeve 20 constructed in accordance with the invention are suitable for use in a variety of applications, regardless of the sizes and lengths required. For example, they could be used in automotive, marine, industrial, aeronautical or aerospace applications, or any other application wherein protective sleeves are desired to protect nearby components against heat and/or fire.

Obviously, many modifications and variations of the present invention are possible in light of the above teachings and may be practiced otherwise than as specifically described while within the scope of the appended invention. It is that all features described and of all embodiments can be combined with each other, so long as such combination would not contradict one another.

What is claimed is:

1. A flexible textile sleeve for protecting an elongated member, the textile sleeve comprising:
    a flexible tubular body having an inner surface and an outer surface;
    a cured coating adhered to said outer surface, said cured coating providing heat resistance to said tubular body; and
    said cured coating being formed from a coating of siloxane having a formula of R—SiO$_{3/2}$ with the R consisting of phenyl functional groups, methyl functional groups, and oxygen, wherein upon curing said coating, said methyl functional groups are decomposed, thereby leaving the cured coating devoid of methyl functional groups and consisting of SiO$_2$ containing phenyl, and leaving the tubular body flexible.

2. The flexible textile sleeve according to claim 1 wherein said tubular body is made from a woven or braided fiberglass yarn.

3. The flexible textile sleeve according to claim 1 wherein said tubular body has a heat resistance of at least 550° C.

* * * * *